(12) United States Patent
Johnston et al.

(10) Patent No.: US 12,499,405 B2
(45) Date of Patent: Dec. 16, 2025

(54) COMPARING NETWORK USAGE AGAINST DIGITAL MODEL PERSONAS

(71) Applicant: Cisco Technology, Inc., San Jose, CA (US)

(72) Inventors: Jay Kemper Johnston, Raleigh, NC (US); David C. White, Jr., St. Petersburg, FL (US); Jeffrey Dominick Jackson, Holly Springs, NC (US); Magnus Mortensen, Cary, NC (US); Matthew R. Engle, Plano, TX (US); Ryan Alan MacLennan, Durham, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 205 days.

(21) Appl. No.: 17/975,192

(22) Filed: Oct. 27, 2022

(65) Prior Publication Data

US 2024/0144150 A1    May 2, 2024

(51) Int. Cl.
*G06Q 10/0639* (2023.01)
*G06F 16/28* (2019.01)

(52) U.S. Cl.
CPC ..... *G06Q 10/06398* (2013.01); *G06F 16/285* (2019.01)

(58) Field of Classification Search
CPC .............. G06Q 10/06398; G06F 16/285
USPC .................................................... 705/7.42
See application file for complete search history.

(56) References Cited

U.S. PATENT DOCUMENTS

| | | | |
|---|---|---|---|
| 11,481,709 B1* | 10/2022 | Liao | G06Q 10/0635 |
| 2008/0172461 A1* | 7/2008 | Thattai | G06Q 10/00 709/204 |
| 2015/0012467 A1* | 1/2015 | Greystoke | G06Q 30/0619 706/12 |
| 2016/0071157 A1* | 3/2016 | Crawford | G06Q 30/0257 705/14.27 |
| 2017/0140285 A1* | 5/2017 | Dotan-Cohen | G06F 9/453 |
| 2018/0300376 A1* | 10/2018 | Yin | G06Q 10/00 |
| 2019/0089711 A1* | 3/2019 | Faulkner | H04L 63/1433 |
| 2020/0387584 A1* | 12/2020 | Gaber | G06F 18/232 |
| 2021/0056458 A1* | 2/2021 | Savova | G06N 20/00 |
| 2022/0108262 A1* | 4/2022 | Cella | G05B 17/02 |
| 2022/0114186 A1* | 4/2022 | Frazier | G06F 21/602 |
| 2022/0208017 A1* | 6/2022 | Hatfield | G06F 16/90332 |

OTHER PUBLICATIONS

Rigby, A., "How to Measure Call Center Performance: 9 Metrics You Can't Ignore," Krisp, https://krisp.ai/blog/call-center-performance/, retrieved Jul. 5, 2022, 11 pages.

* cited by examiner

*Primary Examiner* — Abdallah A El-Hage Hassan
(74) *Attorney, Agent, or Firm* — Edell, Shapiro & Finnan, LLC

(57) ABSTRACT

A management server measures network activity of user devices to determine activities of the users associated with each user device. The management server generates digital model personas corresponding to the users based on one or more activities of the user. The management server clusters the digital model personas to generate user groups based on similar activities, and compares a first digital model persona from a first user with at least one second digital model persona.

21 Claims, 8 Drawing Sheets

COMPARING NETWORK USAGE AGAINST DIGITAL MODEL PERSONAS

TECHNICAL FIELD

The present disclosure relates to tracking network activity of users, specifically to measure worker productivity.

BACKGROUND

Quantifying the performance of knowledge workers presents a challenge for a modern work environment. For typical factory/manufacturing lines in which workers built standard objects, various benchmarks (e.g., time) could be measured to compare the productivity of different workers, if the output product is the same for each worker. A modern office worker (e.g., a call center employee) may be benchmarked against various metrics (e.g., number of calls, duration of calls, sales goals achieved from cold calls, etc.), as standards which may or may not be directly related to the value of the work performed by the worker.

Comparing the quantified productivity of workers with defined benchmarks enables a manager to determine whether a worker would benefit from additional training to address a specific performance metric, whether a worker should receive additional compensation for exceeding benchmarks, and/or whether a worker should be terminated for failing to meet benchmarks. The same type of benchmarking is difficult for knowledge workers with varied output products.

DETAILED DESCRIPTION

Overview

Figure 1:
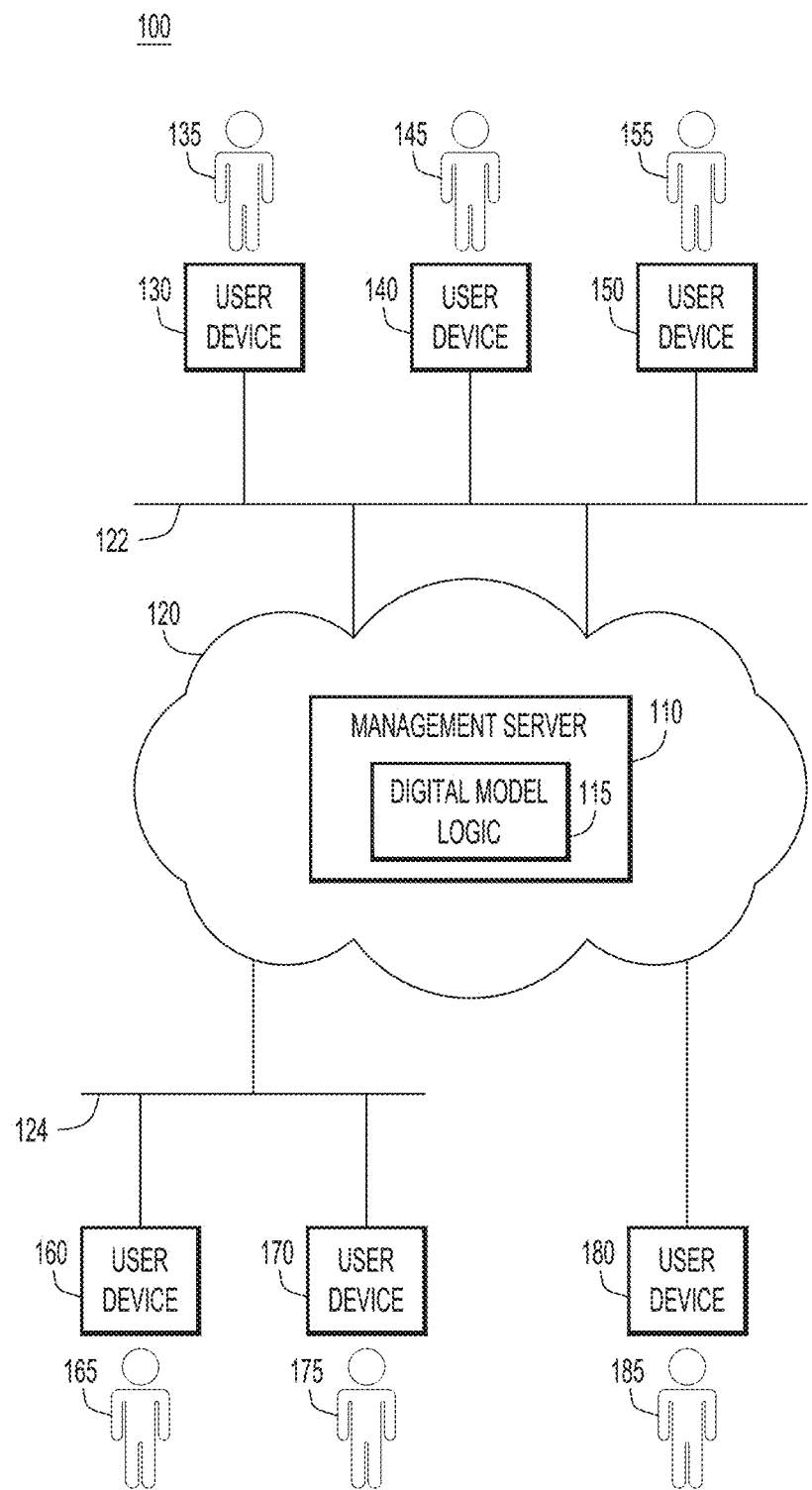
FIG. 1 is simplified block diagram of a network management system configured to monitor network activity of users, according to an example embodiment.

A method is provided to measure performance of users of an organization. The method includes measuring network activity of a plurality of user devices to determine a plurality of activities associated with a plurality of users. Each particular user device is associated with a particular user. The method also includes generating a plurality of digital model personas corresponding to the plurality of users. Each particular digital model persona is based on one or more activities of the plurality of activities. The method further includes clustering the plurality of digital model persona to generate a plurality of user groups based on similar activities. The method also includes comparing a first digital model persona corresponding to a first user with at least one second digital model persona. The first digital model persona is selected from a first user group of the plurality of user groups.

EXAMPLE EMBODIMENTS

The techniques presented herein generate and leverage digital model personas of human users. An organization generates and associates a digital model persona for each human user with a network presence. The actions taken by the human user updates the digital model persona to enable the digital model persona to accurately reflect the network activity of the associated human user. In one example, the digital model persona mimics (e.g., is a duplicate record of) the activities of a human user, and the digital model persona may function as a digital twin of the human user.

As a human user performs network actions (e.g., entering data into a database, submitting a Return Merchandise Authorization (RMA), completing an order, creating a marketing presentation, etc.), a network management server with the digital model persona watches, records, and learns about the network activity of the human user. In one example, the digital model personas may test the availability of the end systems to ensure that the typical activities of a human user are operational. Additionally, the digital model personas may include all of the activities (e.g., filling out a web-based form) or the building blocks (e.g., connecting to a remote server) of the activities that the human user performs regularly.

The digital model personas simulate the behavior of real people and perform test actions based on the network behavior of human users. In one example, each digital model is based on the network behavior of a single, specific human user, such that the digital model persona acts as a digital twin of the human user. In another example, a digital model may be based on an amalgamation of the network behavior of multiple human users, who may share one or more traits. For instance, the network management system may generate a digital model to emulate the network behavior of users in a certain department (e.g., Human Resources (HR) or Engineering), a certain location (e.g., Germany offices, San Jose office, Building C, etc.), and/or a certain job title (e.g., administrative assistant, programmer, managing director, etc.).

The digital models used for digital model personas may be Machine Learning (ML) models leveraging on-machine, on-network, and offline log data to represent the network behavior of an endpoint controlled by a human user. An organization may use a network management system to consider the dimensions of the organizational structure, the physical location of users, and the network location of the user when constructing an ML model as a digital twin of a human user or group of users. Deploying an ML model as a digital model persona on the network generates network behavior that emulates the network activity of a human user. The network management system may place digital model personas at locations on the network for various organizational purposes, such as capacity testing or in anticipation of future growth.

Once digital model personas are generated and maintained for each human user in an organization, the management server may be able to unlock additional insights into the work of the human users. In one example, the network usage of a human user may be compared against an archetypical digital persona to identify human performance issues and/or training opportunities. Additionally, the management server may analyze the digital model personas to identify potential security issues. Furthermore, the digital model personas may be grouped according to the activities performed by the corresponding human users to provide insight into the number of human users have a particular role in the organization, and how particular roles are distributed throughout the organization.

Referring now to FIG. 1, a simplified block diagram illustrates a network system 100 configured to generate and compare digital model personas to gather insights into the actions of the corresponding human users. The network system 100 includes a management server 110 with digital model logic 115. The digital model logic 115 enables the management server 110 to gather information on the network activity of attached user devices, generate digital model personas, and compare the digital model personas to obtain insight into the activities of the users.

The network system 100 includes a network 120 (e.g., a cloud network) as well as networks 122 and 124 (e.g., Local Area Networks (LANs)). A user device 130 associated with a user 135 is connected to the network 120 through the network 122. Similarly, user devices 140 and 150, which are associated with users 145 and 155, respectively, are also connected to the network 120 through the network 122. User devices 160 and 170, which are associated with users 165 and 175, respectively, are connected to the network 120 through the network 124. A user device 180 associated with a user 185 is directly connected to the network 120.

The combination of networks 120, 122, and 124, as shown in FIG. 1, illustrates one example of a network topology for the network system 100. In other examples, the network system 100 may include other network topologies (e.g., a Wide Area Network (WAN), more or fewer LANs, etc.). In general, the network system 100 communicatively connects a plurality of computing devices (e.g., user devices 130, 140, 150, 160, 170, and 180) that may be used by a plurality of users (e.g., users 135, 145, 155, 165, 175, and 185) in an organization (e.g., a company).

With a digital model persona associated with each user in an organization tracking users' interactions with network systems (e.g., which systems, the timing/duration of the interactions, etc.), the management server 110 may cluster the digital model personas based on similar network activity. In one example, the management server 110 may use a Machine Learning (ML) clustering algorithm to group the digital model personas into user groups. Each cluster/user group may be assigned a role (e.g., support personnel, business development, sales, human resources, facilities, administrative, etc.).

Figure 2A:
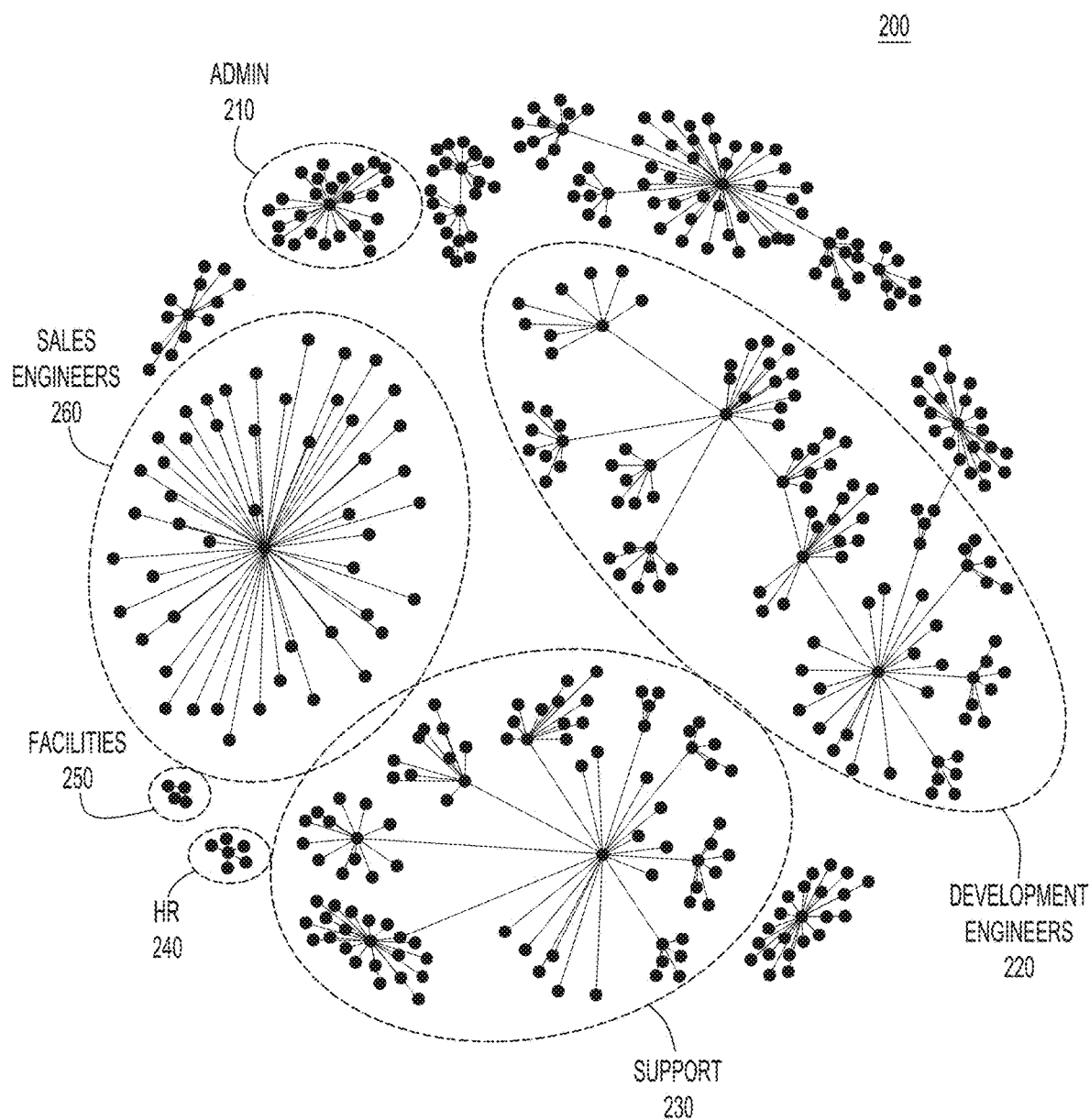
FIG. 2A illustrates clustering of digital model personas by network activity, according to an example embodiment.

Referring now to FIG. 2A, a cluster graph 200 illustrates the user groups obtained by clustering the digital model personas based on similar network activity. The cluster graph 200 includes user groups 210, 220, 230, 240, 250, and 260 that each associate a groups of digital model personas based on the network activity associated with the digital model persona. Additional digital model personas may be clustered into unlabeled clusters or isolated (e.g., for a unique pattern of network activity).

The user group 210 clusters digital model personas that perform activities associated with administrative personnel (e.g., preparing and filing documents, coordinating scheduled appointments, internal and external communications, etc.). The user group 220 clusters digital model personas that perform activities associated with development engineers (e.g., programming, internal communication within a team, etc.). Similarly, the user groups 230, 240, 250, and 260 cluster digital model personas that perform activities associated with support personnel, Human Resource (HR) personnel, facilities operations personnel, and sales engineers, respectively.

Figure 2B:
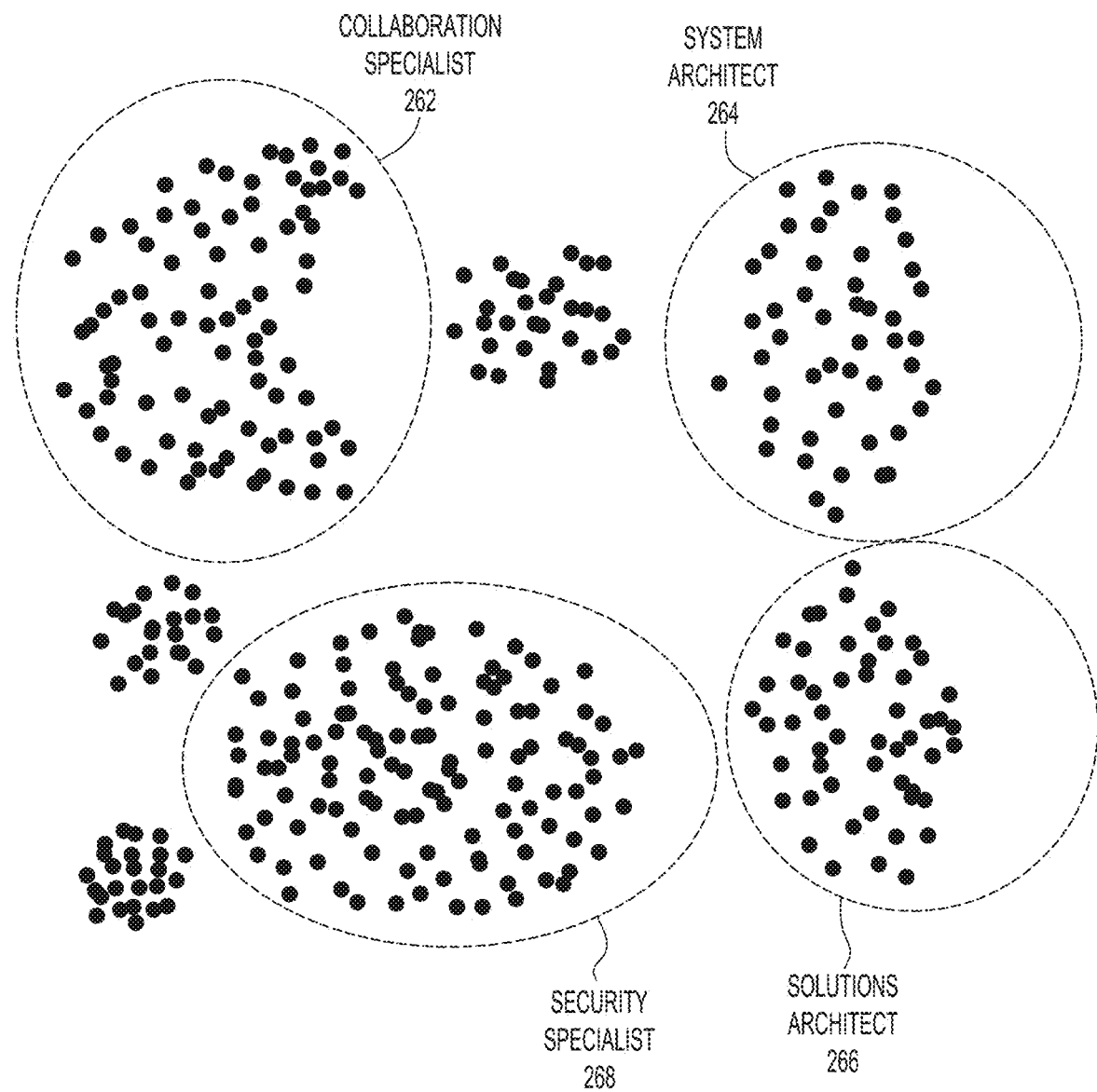
FIG. 2B illustrates sub-clustering of a cluster of digital model personas, according to an example embodiment.

The cluster graph 200 may be viewed at different depths by focusing on a particular user group, such as user group 260 of sales engineers, as shown in FIG. 2B. The user group 260 of sales engineers is further clustered into a sub-group 262 of collaboration specialists, a sub-group 264 of system architects, a sub-group 266 of solutions architects, and a sub-group 268 of security specialists.

By clustering the digital model personas into different user groups, the management server may generate a visualization for the different roles that exist within an organization. The clustering based on actual network activity may identify discrepancies between the official job title of a user and the actual role the user plays within the organization. Additionally, as organizations grow and change, job titles may become outdated and cease to accurately reflect the actual role of each individual in the organization. The techniques presented herein provide a real-time window into the organization to see what roles individual people play based on the network activities of the individual users as observed and recorded by a digital model persona associated with each individual user.

In one example, the management server may observe the users within an organization to determine whether there are individuals with titles and user roles that no longer match. For instance, the management server may identify a digital model persona of a user with a human resources title (e.g., Administrative Assistant—FIR) that performs network activities that are typically more associated with development engineers. Executives of the organization may learn that the work this user is performing does not match the user's title (e.g., the user is not an administrative assistant) and the user is not classified in the correct division of the organization (e.g., the user does not perform work for the HR department). The user may then be transferred to the correct division (e.g., Software Development) so they may get the benefits provided by the correct division (e.g., code reviews, mentorship, etc.).

In another example, a large organization may provide resources to improve processes that reach throughout various divisions of the organization. For instance, users may be encouraged to submit improvements to a help desk system in different divisions (e.g., support engineers may provide machine consumable modules of intellectual capital, development engineers may provide technical documents, administrative personnel may provide external contact information for specific issues, etc.). The techniques presented herein enable the organization leadership to visualize and interpret data about how users across the entire organization contribute to the help desk system.

By grouping the digital model personas of users, the management server may provide a more detailed analysis of users that have the same role (e.g., users in the same user group). Additionally, the management server may determine a baseline average duration of time for a user in a user group to complete an activity. The baseline time enables the management server to discover outliers who deviate significantly from the average, such as users who perform that activity particularly quickly or particularly slowly. The management server may identify training opportunities for the lower performing users to improve their performance. Additionally, lower performing users may be assigned a mentor selected from the higher performing users.

In a further example, some user groups may have outlier digital model personas that might indicate harmful or wasteful actions. For instance, if a few digital model personas are identified as working at a rate that is 80% below their peers in the same user group, the management server may provide a recommendation to investigate the cause of the outlier behavior. In another instance, if one or more digital model personas are found to perform activities that are not generally used by peers in their user group (e.g., human resource employees accessing engineering resources), then the management server may notify an administrator to recommend an investigation to determine whether the user accounts have been compromised. Recent changes to the digital model persona that generate outlier behavior may provide additional evidence that the corresponding user account may be compromised. Additionally, the management server may compare the recent network activity of a user device with the digital model persona of the corresponding to the user device to determine whether the recent network activity presents outlier behavior.

With all users having a corresponding digital model persona, and each digital model persona grouped into a user group, the management server may easily detect outlier behavior. Activities such as financial transactions and/or uploads of data to unknown destinations (e.g., external cloud providers) become easily detectable as anomalies for a user group that does not typically perform these activities. For instance, users in the accounting user group will typically perform financial transactions, but users in the engineering department would have little need to perform financial transactions. Similarly, users in an Information Technology user group or in a machine learning software development user group may regularly upload large amounts of data to cloud providers, but the same type of activity from a user in the accounting user group will be anomalous and may indicate a security issue.

Figure 3:
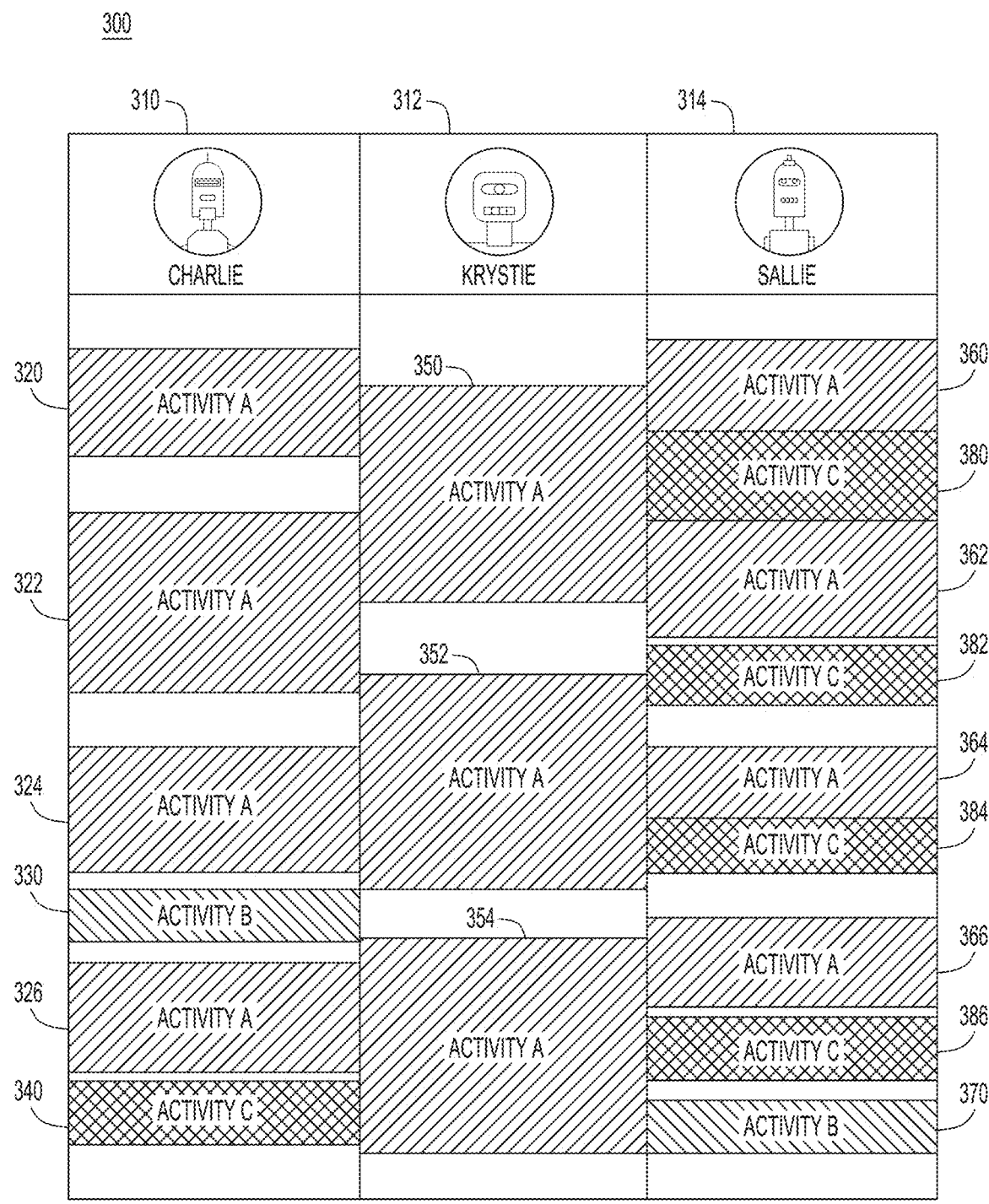
FIG. 3 illustrates a comparison of the activities of digital model personas, according to an example embodiment.

Referring now to FIG. 3, a chart 300 illustrates a comparison between three digital model personas associated with users in the same user group. The chart 300 compares the daily schedule of digital model persona 310 (e.g., Charlie), digital model persona 312 (e.g., Krystie), and digital model persona 314 (e.g., Sallie). Each of the digital model personas 310, 312, and 314 is associated with a corresponding individual user, and the digital model persona represents a typical day of network activities performed by the corresponding user. In the example shown in FIG. 3, the chart 300 shows the digital model personas 310, 312, and 314 with schedules to perform three different activities including a first activity A (e.g., resolving customer issues), a second activity B (e.g., filing a bug report), and a third activity C (e.g., creating intellectual capital modules).

The digital model persona 310 includes the first activity A at four different times throughout the day as activity 320, 322, 324, and 326. The digital model persona 310 also includes the second activity B once in the middle of the day as activity 330. The digital model persona further includes the third activity C once at the end of the day as activity 340.

The digital model persona 312 includes the first activity A at three different times throughout the day as activity 350, 352, and 354. The digital model persona 312 does not include any instances of the second activity B or the third activity C, since the corresponding user does not perform these activities on a regular basis.

The digital model persona 314 includes the first activity A at four different times throughout the day as activity 360, 362, 364, and 366. The digital model persona 314 also includes the second activity B once at the end of the day as activity 370. The digital model persona 314 further includes the third activity C as activity 380, 382, 384, and 386, with each instance of the third activity C occurring soon after an instance of the first activity A.

In the example shown in FIG. 3, each instance of activity A for the digital model persona 312 (i.e., activity 350, 352, and 354) takes a longer amount of time to perform than the instances of activity A performed by either digital model persona 310 (i.e., activity 320, 322, 324, and 324) or digital model persona 314 (i.e., activity 360, 362, 364, and 366). From this information, the management server may determine that the user associated with the digital model persona 312 may benefit from additional training in performing activity A.

Additionally, the management server may detect that the user associated with the digital model persona 310 is not following the best practices of the organization by waiting until the end of the day to perform the activity C (i.e., activity 340) instead of performing activity C after each instance of activity A (i.e., activity 320, 322, 324, and 326). The management server may recommend a reminder or additional training for the user associated with digital model persona 310 to reinforce the best practices of the organization. For instance, a user may be trained to create an intellectual capital module after each time the user helps a customer resolve an issue. Having the solution to the customer's issue fresh in the user's mind enables the user to generate the related intellectual capital module quickly and accurately.

With multiple users performing the same role within an organization, some users will inevitably rise as top performers. Identifying the top performers as an archetype for the user group provides the other users in the user group with a performance standard to strive toward. The organization may determine specific Key Performance Indicators (KPIs) for the user group, and compare the digital model personas clustered into the user group to determine which user best exemplifies the archetype for the user group.

Figure 4:
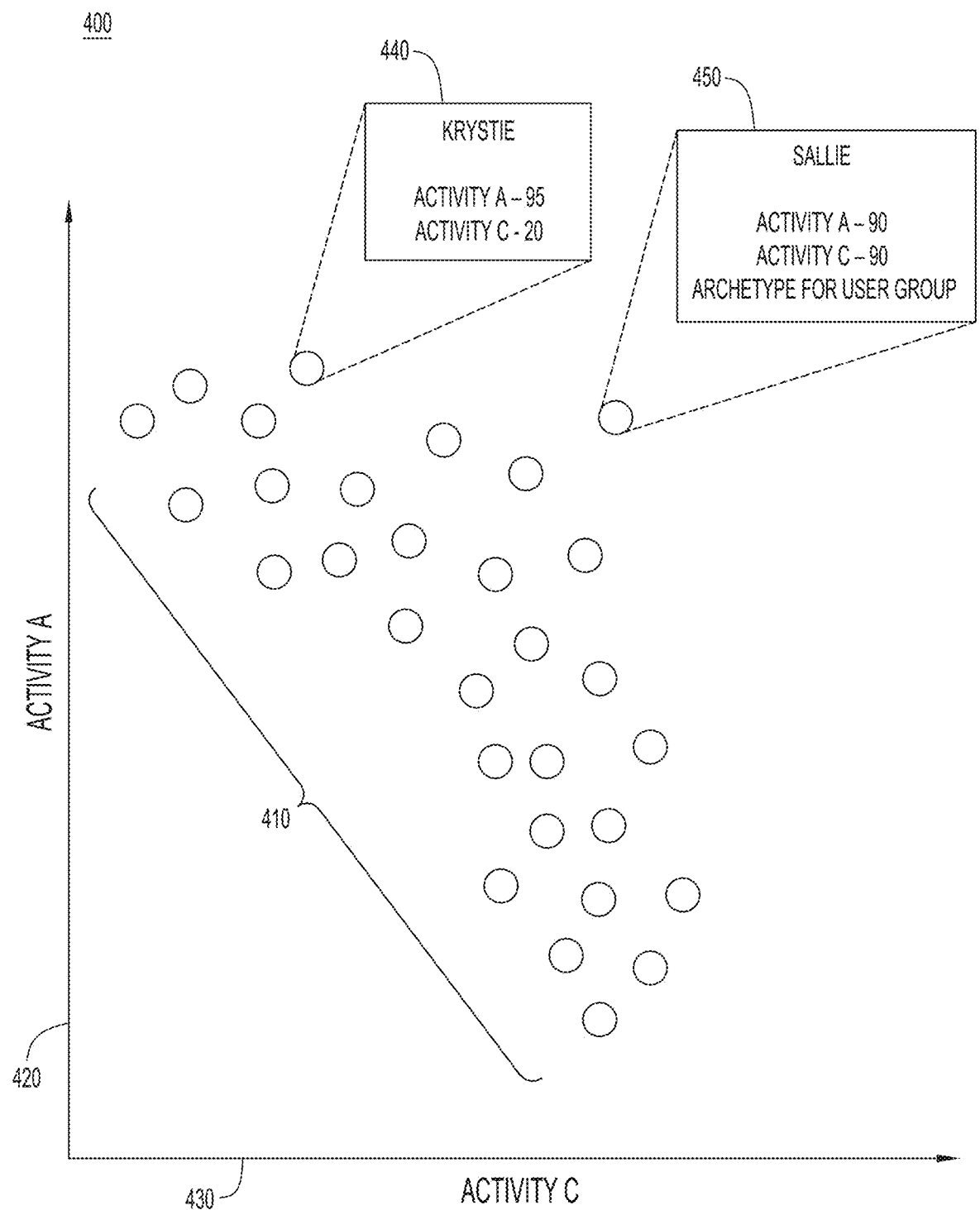
FIG. 4 is a graph that shows the selection of a cohort archetype based on business metrics, according to an example embodiment.

Referring now to FIG. 4, a graph 400 illustrates the selection of an archetypical digital model persona based on business metrics. The graph 400 plots the effectiveness of digital model personas 410 across business metrics for two user activities. In one example, the digital model personas are selected from a user group defined by clustering digital model personas according to their activities. The digital model personas 410 are plotted along a first axis 420 that represents the effectiveness of users at performing activity A and a second axis 430 that represents the effectiveness of users at performing activity C.

Two of the digital model personas are highlighted to illustrate how an organization may select a digital model persona as an archetype for the user group of all of the digital model personas 410. The digital model persona 440 (e.g., Krystie) is ranked as the highest performer for activity A, but a lower performer for activity C. In one example, the digital model persona 440 may indicate that the corresponding user is highly effective at resolving customer issues, but not particularly effective at generating intellectual capital modules. The digital model persona 450 (e.g., Sallie) is ranked as a high performer for both activity A and activity C. In one example, the digital model persona 450 may indicate that the corresponding user is effective at both resolving customer issues and generating intellectual capital modules.

In another example, the organization may prioritize effectiveness at both activity A and activity C for this user group. The management server may determine that the digital model persona 450 is best suited to be the archetype for the user group of the digital model personas 410 based on being the indicated proficiency at both activity A and activity C. Alternatively, the organization may value activity A above every other metric and select the digital model persona 440 as the archetype for the user group since the digital model persona 440 is the most effective at performing the activity A.

In a further example, the organization may consider more than two activities captured by the digital model personas and generate a multi-dimensional representation of the effectiveness of digital model personas over all of the different activities. Additionally, the organization may weight some activities higher than other activities when considering the selection of the archetype. For instance, the organization may determine that activity A, activity B, and activity C are important components of the job performance of users in the user group, but activity A is the primary responsibility. The organization may weight the effectiveness of activity A at 70%, and the effectiveness at activity B and activity C at 15% each when selecting the archetype for the user group.

In a specific example, an organization may be interested in the generation of intellectual capital modules that enable quick resolutions of the common customer issues in the future, as well as resolving the current customer issues. As a result, the digital model persona that indicates the user is effective at both activities may be selected as an archetype for the user group. The organization may provide users associated with the other digital model personas of the user group with recommendations to adjust their work process to align with the archetype digital model persona. For instance, if the selected archetype digital model persona interleaves the generation of intellectual capital modules with resolving customer issues, the users associated with the other digital model personas may be directed to do the same rather than wait until the end of the day to generate the intellectual capital modules.

Figure 5:
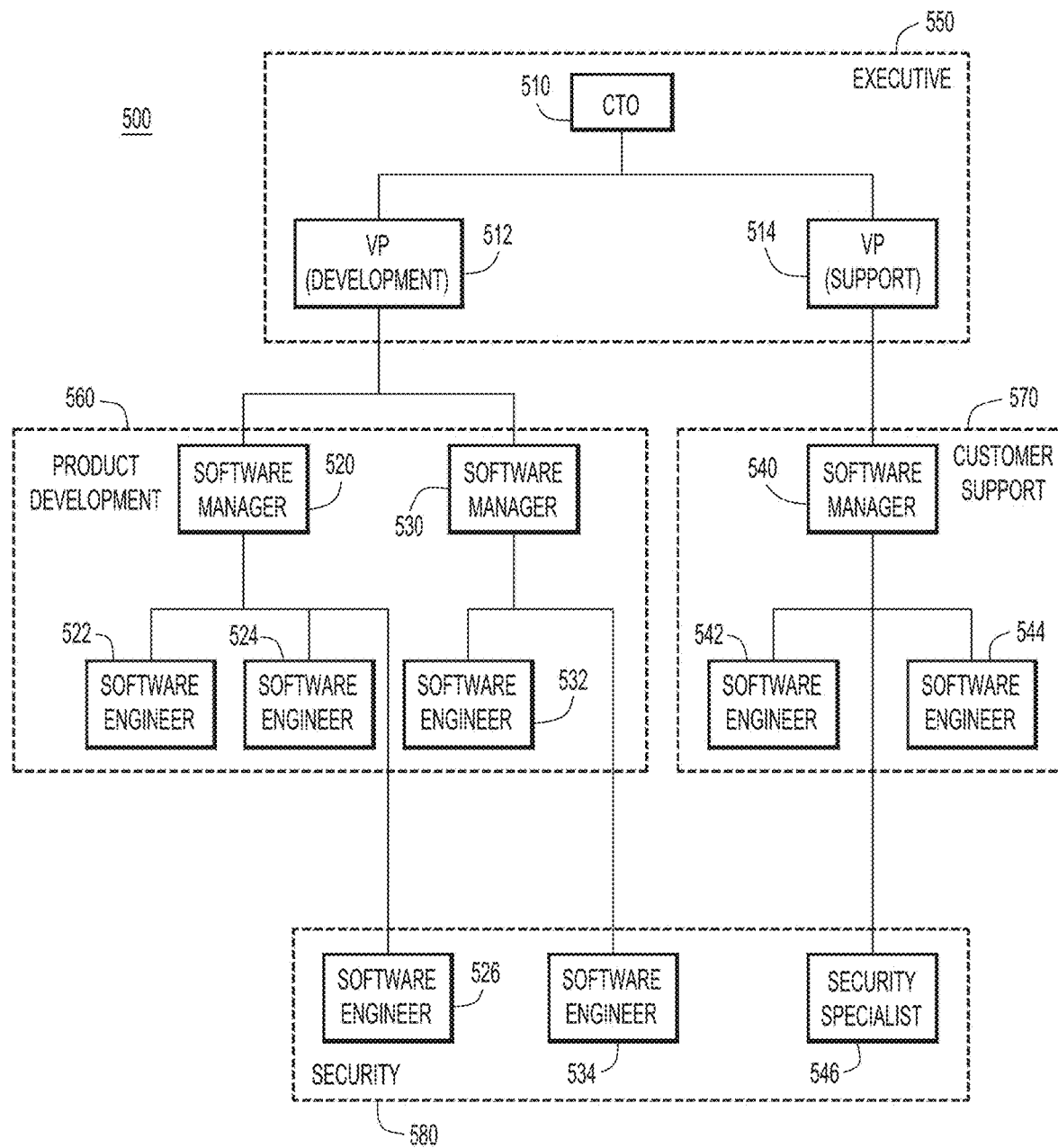
FIG. 5 illustrates an organizational chart that is cross-referenced with user roles determined by clustering based on network activity, according to an example embodiment.

Referring now to FIG. 5, an organizational chart 500 illustrates how clustering of digital model personas may identify mismatches between the nominal job activities of users and the actual job activities of users. The organizational chart 500 includes several users, such as a Chief Technology Officer (CTO) 510 that oversees a Vice President (VP) 512 of Development and a VP 514 of Support. The VP 512 oversees software managers 520 and 530. The software manager 520 oversees software engineers 522, 524, and 526. The software manager 530 oversees software engineers 532 and 534. The VP 514 oversees a software manager 540, and the software manager 540 oversees software engineers 542 and 544, as well as a security specialist 546.

A management server clusters the digital model personas corresponding to the users in the organizational chart 500 and determines a user group for each digital model persona based on the network activity recorded in the digital model persona. The CTO 510, the VP 512, and the VP 514 are grouped into a user group 550 (e.g., a user group for executives of the organization). The software managers 520 and 530, and the software engineers 522, 524, and 532 are grouped into a user group 560 (e.g., a user group of product development engineers). The software manager 540 and the software engineers 542 and 544 are grouped into a user group 570 (e.g., a user group of customer support engineers). The software engineers 526 and 534, and the security specialist 546 are grouped into a user group 580 (e.g., a user group of security engineers).

In one example, by looking the user groups 550, 560, 570, and 580, an organization may realign the organizational chart 500 to comport with the actionable outcomes of each user. With the digital model personas representing the actual network activity of users, the management server may cluster the users into user groups based on the type of work they do, and provide a realignment suggestion to correct any misalignment with the organizational chart 500. For instance, the digital model personas of the software engineer 526 and the security specialist 546 are sufficiently similar to both be grouped in the user group 580, but the users are only linked at the top of the organizational chart 500 through the CTO 510. The similarity in digital model personas suggest that these two users may be performing the same work, but are unaware of each other's existence.

In another example, the organization may address the mismatch between the organizational chart 500 and the user group 580 of software security specialists by moving one or more of the software engineer 526, the software engineer 534, and/or the security specialist 546 into their own branch on the organizational chart 500. Additionally, the organization may determine that the software engineer 526 and the software engineer 534 should be reclassified with a job title of "security specialist" to align with the job title of the security specialist 546.

Figure 6:
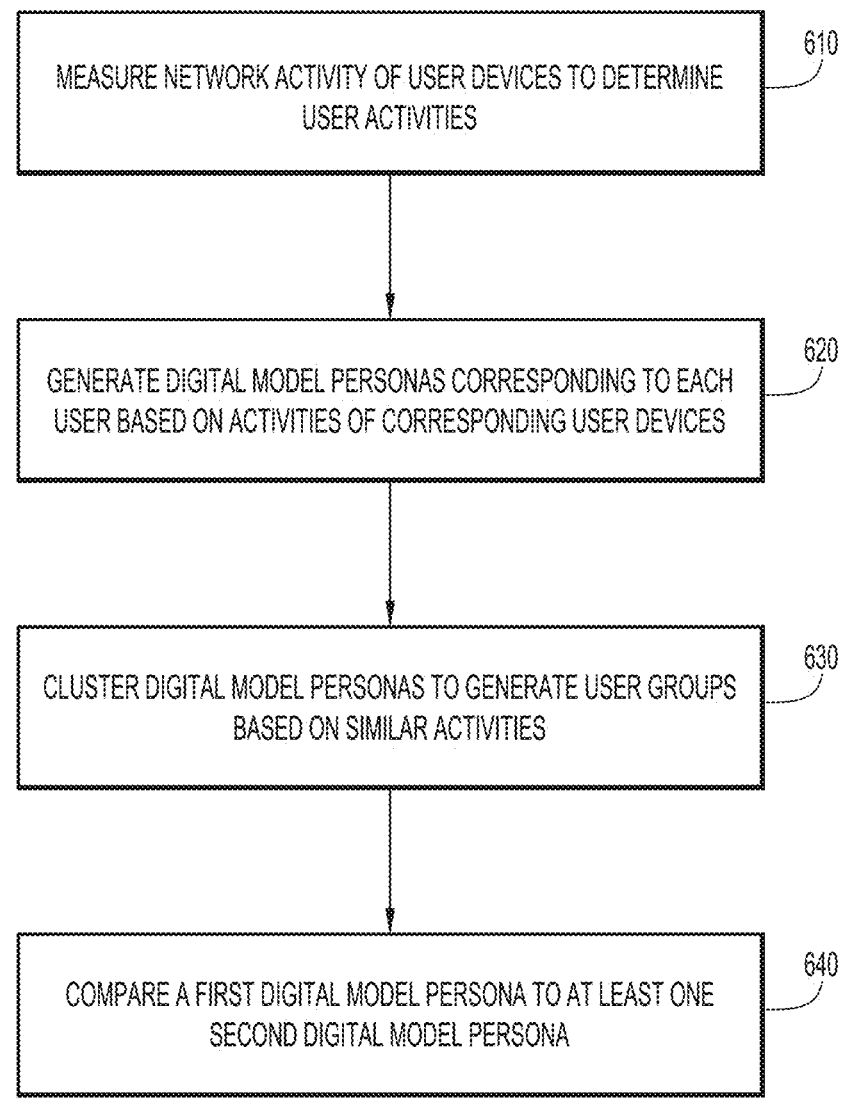
FIG. 6 is a flowchart illustrating operations performed by a management server to generate and compare digital model personas based on network activity, according to an example embodiment.

Referring now to FIG. 6, a flowchart illustrates an example process 600 performed by a management server (e.g., management server 110) to cluster digital model personas and compare the digital model personas for insight into the activities of the corresponding users. At 610, the management server measures the network activity of a plurality of user devices to determine a plurality of activities associated with a plurality of users. Each particular user device is associated with a particular user. In one example, the network activity of a user device may be associated with a particular activity performed by the user of the user device. For instance, accessing a particular database (e.g., a database of accounts receivable) may be associated with the user performing a particular activity (e.g., a financial transaction).

At 620, the management server generates a plurality of digital model personas corresponding to the plurality of users based one or more of the activities associated with the users. In one example, each digital model persona corresponds to one of the plurality of users. In another example, each digital model persona includes a record of activities that the corresponding user typically performs and serves as a digital twin of the user.

At 630, the management server clusters the digital model personas to generate user groups based on similar activities of the corresponding users. In one example, the user groups identify digital model personas corresponding to user devices that perform similar activities due to job responsibilities of the corresponding users. In another example, the management server may further generate sub-groups within a particular user group based on clustering the digital model personas within that particular user group.

At 640, the management server compares a first digital model persona selected from a first user group with at least one second digital model persona. In one example, the second digital persona is also selected from the first user group. For instance, the second digital model persona may be selected as an archetype for the first user group. In another example, the comparison between the first digital model persona and the at least one second digital model persona may cause the management server to identify a training opportunity for the first user associated with the first digital model persona. Alternatively, the comparison may identify potential security risks caused by the network activity of the first user device.

Figure 7:
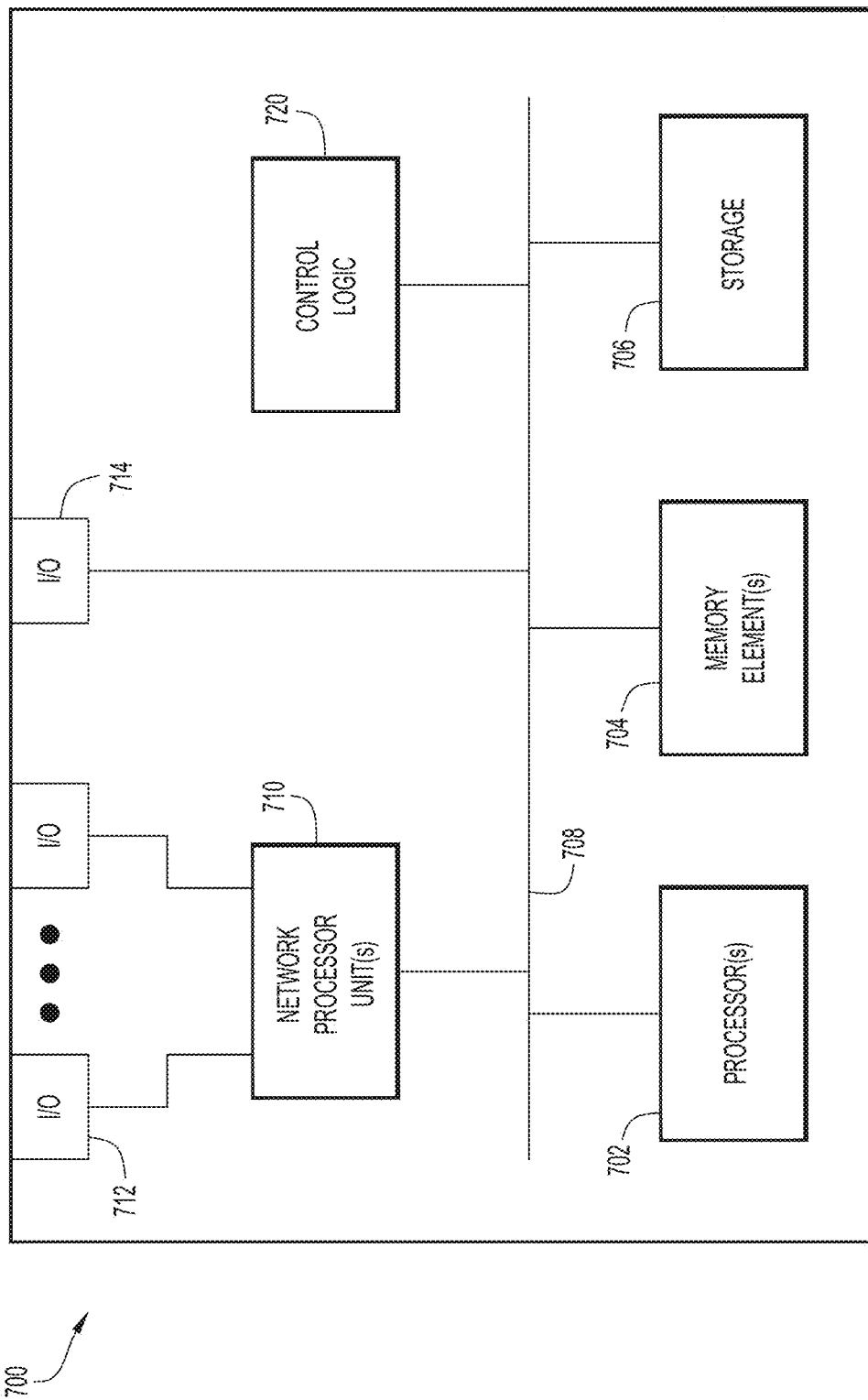
FIG. 7 is a block diagram of a computing device that may be configured to perform the techniques presented herein, according to an example embodiment.

Referring to FIG. 7, FIG. 7 illustrates a hardware block diagram of a computing device 700 that may perform functions associated with operations discussed herein in connection with the techniques depicted in FIGS. 1, 2A, 2B, and 3-6. In various embodiments, a computing device, such as computing device 700 or any combination of computing devices 700, may be configured as any entity/entities as discussed for the techniques depicted in connection with FIGS. 1, 2A, 2B, and 3-6 in order to perform operations of the various techniques discussed herein.

In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In summary, the techniques presented herein provide a novel way to measure human performance in a knowledge focused work environment through the performance of a corresponding digital model persona. Additionally, by maintaining a digital model persona of every worker, an organization may gain insight into the job functions actually performed by the workers instead of relying on an organization structure or a job title of the worker. Grouping digital model personas into user groups associated with specific job types enables enhanced detection of anomalous activities, including security issues.

In some aspects, the techniques described herein relate to a method including: measuring network activity of a plurality of user devices to determine a plurality of activities associated a plurality of users, wherein each particular user device of the plurality of user devices is associated with a particular user of the plurality of users; generating a plurality of digital model personas corresponding to the plurality of users, each particular digital model persona based on one or more activities of the plurality of activities; clustering the plurality of digital model personas to generate a plurality of user groups based on similar activities among the plurality of activities; and comparing a first digital model persona corresponding to a first user with at least one second digital model persona, the first digital model persona selected from a first user group of the plurality of user groups.

In some aspects, the techniques described herein relate to a method, further including: comparing the plurality of user groups generated from clustering the plurality of digital model personas with a plurality of user titles associated with an organizational chart of the plurality of users; and providing a realignment suggestion for the plurality of user titles based on the plurality of user groups.

In some aspects, the techniques described herein relate to a method, wherein the at least one second digital model persona is among the first user group, the method further including selecting one of the at least one second digital model persona as an archetype for the first user group based on business metrics associated with the one or more activities of the at least one second digital model persona.

In some aspects, the techniques described herein relate to a method, further including comparing the first digital model persona with the archetype for the first user group to determine a training opportunity for the first user.

In some aspects, the techniques described herein relate to a method, wherein the training opportunity for the first user is associated with the one or more activities of the first digital model persona.

In some aspects, the techniques described herein relate to a method, further including identifying outlier behavior for a first user device associated with the first user based on a comparison of recent network activity of the first user device with the first digital model persona.

In some aspects, the techniques described herein relate to a method, further including notifying an administrator if the outlier behavior presents a security risk.

In some aspects, the techniques described herein relate to an apparatus including: a network interface configured to communicate with computing devices in a computer network; and a processor coupled to the network interface, the processor configured to: measure network activity of a plurality of user devices to determine a plurality of activities associated a plurality of users, wherein each particular user device of the plurality of user devices is associated with a particular user of the plurality of users; generate a plurality of digital model personas corresponding to the plurality of users, each particular digital model persona based on one or more activities of the plurality of activities; cluster the plurality of digital model personas to generate a plurality of user groups based on similar activities among the plurality of activities; and compare a first digital model persona corresponding to a first user with at least one second digital model persona, the first digital model persona selected from a first user group of the plurality of user groups.

In some aspects, the techniques described herein relate to an apparatus, wherein the processor is further configured to: compare the plurality of user groups generated from clustering the plurality of digital model personas with a plurality of user titles associated with an organizational chart of the plurality of users; and provide a realignment suggestion for the plurality of user titles based on the plurality of user groups.

In some aspects, the techniques described herein relate to an apparatus, wherein the at least one second digital model persona is among the first user group, and wherein the processor is further configured to select one of the at least one second digital model persona as an archetype for the first user group based on business metrics associated with the one or more activities of the at least one second digital model persona.

In some aspects, the techniques described herein relate to an apparatus, wherein the processor is further configured to compare the first digital model persona with the archetype for the first user group to determine a training opportunity for the first user.

In some aspects, the techniques described herein relate to an apparatus, wherein the training opportunity for the first user is associated with the one or more activities of the first digital model persona.

In some aspects, the techniques described herein relate to an apparatus, wherein the processor is further configured to identify outlier behavior for a first user device associated with the first user based on a comparison of recent network activity of the first user device with the first digital model persona.

In some aspects, the techniques described herein relate to an apparatus, wherein the processor is further configured to cause the network interface to notify an administrator if the outlier behavior presents a security risk.

In some aspects, the techniques described herein relate to one or more non-transitory computer readable storage media encoded with software including computer executable instructions that, when the software is executed on a computing device, is operable to cause a processor of the computing device to: measure network activity of a plurality of user devices to determine a plurality of activities associated a plurality of users, wherein each particular user device of the plurality of user devices is associated with a particular user of the plurality of users; generate a plurality of digital model personas corresponding to the plurality of users, each particular digital model persona based on one or more activities of the plurality of activities; cluster the plurality of digital model personas to generate a plurality of user groups based on similar activities among the plurality of activities; and compare a first digital model persona corresponding to a first user with at least one second digital model persona, the first digital model persona selected from a first user group of the plurality of user groups.

In some aspects, the techniques described herein relate to one or more non-transitory computer readable storage media, wherein the software is further operable to cause the processor to: compare the plurality of user groups generated from clustering the plurality of digital model personas with a plurality of user titles associated with an organizational chart of the plurality of users; and provide a realignment suggestion for the plurality of user titles based on the plurality of user groups.

In some aspects, the techniques described herein relate to one or more non-transitory computer readable storage media, wherein the software is further operable to cause the processor to select one of the at least one second digital model persona as an archetype for the first user group based on business metrics associated with the one or more activities of the at least one second digital model persona, wherein the at least one second digital model persona is among the first user group.

In some aspects, the techniques described herein relate to one or more non-transitory computer readable storage media, wherein the software is further operable to cause the processor to compare the first digital model persona with the archetype for the first user group to determine a training opportunity for the first user, and wherein the training opportunity for the first user is associated with the one or more activities of the first digital model persona.

In some aspects, the techniques described herein relate to one or more non-transitory computer readable storage media, wherein the software is further operable to cause the processor to identify outlier behavior for a first user device associated with the first user based on a comparison of recent network activity of the first user device with the first digital model persona.

In some aspects, the techniques described herein relate to one or more non-transitory computer readable storage media, wherein the software is further operable to cause the processor to notify an administrator if the outlier behavior presents a security risk.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   generating a plurality of digital model personas corresponding to a plurality of users, each digital model persona is a digital twin configured to emulate one or more network activities of a plurality of network activities, and wherein each digital model persona includes a machine learning model generated based on a physical location and a network location of a respective user of the plurality of users;
   clustering the plurality of digital model personas to generate a plurality of user groups based on similar activities among the plurality of network activities;
   comparing a first digital model persona corresponding to a first user with at least one second digital model persona, the first digital model persona and the at least one second digital model persona are selected from a first user group of the plurality of user groups;
   detecting, based on the comparing, a network anomaly associated with one or more recent activities of a first user device associated with the first user, the network anomaly involving a first network activity performed by the first digital model persona includes uploading data to an unknown destination and a second network activity performed by the at least one second digital model persona does not include uploading the data to the unknown destination;
   generating, based on the network anomaly, an electronic notification that the one or more recent activities present security risks that compromise a network system; and
   transmitting the electronic notification to alert an administrator of the network system.

2. The method of claim 1, further comprising:
   comparing the plurality of user groups generated from clustering the plurality of digital model personas with a plurality of user titles associated with an organizational chart of the plurality of users; and
   providing a realignment suggestion for the plurality of user titles based on the plurality of user groups.

3. The method of claim 1, the method further comprising selecting a particular digital model persona from the first user group as an archetype for the first user group based on business metrics associated with one or more network activities of the particular digital model persona.

4. The method of claim 3, further comprising comparing the first digital model persona with the archetype for the first user group to determine a training opportunity for the first user.

5. The method of claim 4, wherein the training opportunity for the first user is associated with one or more network activities of the first digital model persona.

6. The method of claim 1, further comprising identifying outlier behavior for the first digital model persona based on a comparison of a first working rate of the first digital model persona to a second working rate of another digital model persona selected from the first user group.

7. The method of claim 6, further comprising notifying the administrator if the outlier behavior presents a security risk.

8. An apparatus comprising:
a network interface configured to communicate with computing devices in a computer network; and
a processor coupled to the network interface, the processor configured to:
generate a plurality of digital model personas corresponding to a plurality of users, each digital model persona is a digital twin configured to emulate one or more network activities of a plurality of network activities, and wherein each digital model persona includes a machine learning model generated based on a physical location and a network location of a respective user of the plurality of users;
cluster the plurality of digital model personas to generate a plurality of user groups based on similar activities among the plurality of network activities;
compare a first digital model persona corresponding to a first user with at least one second digital model persona, the first digital model persona and the at least one second digital model persona are selected from a first user group of the plurality of user groups;
detect, based on the comparing, a network anomaly associated with one or more recent activities of a first user device associated with the first user, the network anomaly involving a first network activity performed by the first digital model persona includes uploading data to an unknown destination and a second network activity performed by the at least one second digital model persona does not include uploading the data to the unknown destination;
generate, based on the network anomaly, an electronic notification that the one or more recent activities present security risks that compromise a network system; and
transmit the electronic notification to alert an administrator of the network system.

9. The apparatus of claim 8, wherein the processor is further configured to:
compare the plurality of user groups generated from clustering the plurality of digital model personas with a plurality of user titles associated with an organizational chart of the plurality of users; and
provide a realignment suggestion for the plurality of user titles based on the plurality of user groups.

10. The apparatus of claim 8, wherein the processor is further configured to select a particular digital model persona from the first user group as an archetype for the first user group based on business metrics associated with one or more network activities of the particular digital model persona.

11. The apparatus of claim 10, wherein the processor is further configured to compare the first digital model persona with the archetype for the first user group to determine a training opportunity for the first user.

12. The apparatus of claim 11, wherein the training opportunity for the first user is associated with one or more network activities of the first digital model persona.

13. The apparatus of claim 8, wherein the processor is further configured to identify outlier behavior for the first digital model persona based on a comparison of a first working rate of the first digital model persona to a second working rate of another digital model persona selected from the first user group.

14. The apparatus of claim 13, wherein the processor is further configured to cause the network interface to notify the administrator if the outlier behavior presents a security risk.

15. One or more non-transitory computer readable storage media encoded with software comprising computer executable instructions that, when the software is executed on a computing device, is operable to cause a processor of the computing device to:
generate a plurality of digital model personas corresponding to a plurality of users, each digital model persona is a digital twin configured to emulate one or more network activities of a plurality of network activities, and wherein each digital model persona includes a machine learning model generated based on a physical location and a network location of a respective user of the plurality of users;
cluster the plurality of digital model personas to generate a plurality of user groups based on similar activities among the plurality of network activities;
compare a first digital model persona corresponding to a first user with at least one second digital model persona, the first digital model persona and the at least one second digital model persona are selected from a first user group of the plurality of user groups;
detect, based on the comparing, a network anomaly associated with one or more recent activities of a first user device associated with the first user, the network anomaly involving a first network activity performed by the first digital model persona includes uploading data to an unknown destination and a second network activity performed by the at least one second digital model persona does not include uploading the data to the unknown destination;
generate, based on the network anomaly, an electronic notification that the one or more recent activities present security risks that compromise a network system; and
transmit the electronic notification to alert an administrator of the network system.

16. The one or more non-transitory computer readable storage media of claim 15, wherein the software is further operable to cause the processor to:
compare the plurality of user groups generated from clustering the plurality of digital model personas with a plurality of user titles associated with an organizational chart of the plurality of users; and
provide a realignment suggestion for the plurality of user titles based on the plurality of user groups.

17. The one or more non-transitory computer readable storage media of claim 15, wherein the software is further operable to cause the processor to select a particular digital model persona from the first user group as an archetype for the first user group based on business metrics associated with one or more network activities of the particular digital model persona.

18. The one or more non-transitory computer readable storage media of claim 17, wherein the software is further operable to cause the processor to compare the first digital model persona with the archetype for the first user group to determine a training opportunity for the first user, and wherein the training opportunity for the first user is associated with one or more network activities of the first digital model persona.

19. The one or more non-transitory computer readable storage media of claim 15, wherein the software is further operable to cause the processor to identify outlier behavior for the first digital model persona based on a comparison of a first working rate of the first digital model persona to a second working rate of another digital model persona selected from the first user group.

20. The one or more non-transitory computer readable storage media of claim 19, wherein the software is further operable to cause the processor to notify the administrator if the outlier behavior presents a security risk.

21. The method of claim 1, wherein at least one digital model persona of the plurality of digital model personas is configured to emulate an amalgamation of network activities of multiple users selected from the plurality of users.

* * * * *